(No Model.) 2 Sheets—Sheet 1.
J. H. PENDLETON & L. MOSS.
GUIDE PULLEY FOR CABLE RAILWAYS.
No. 404,498. Patented June 4, 1889.
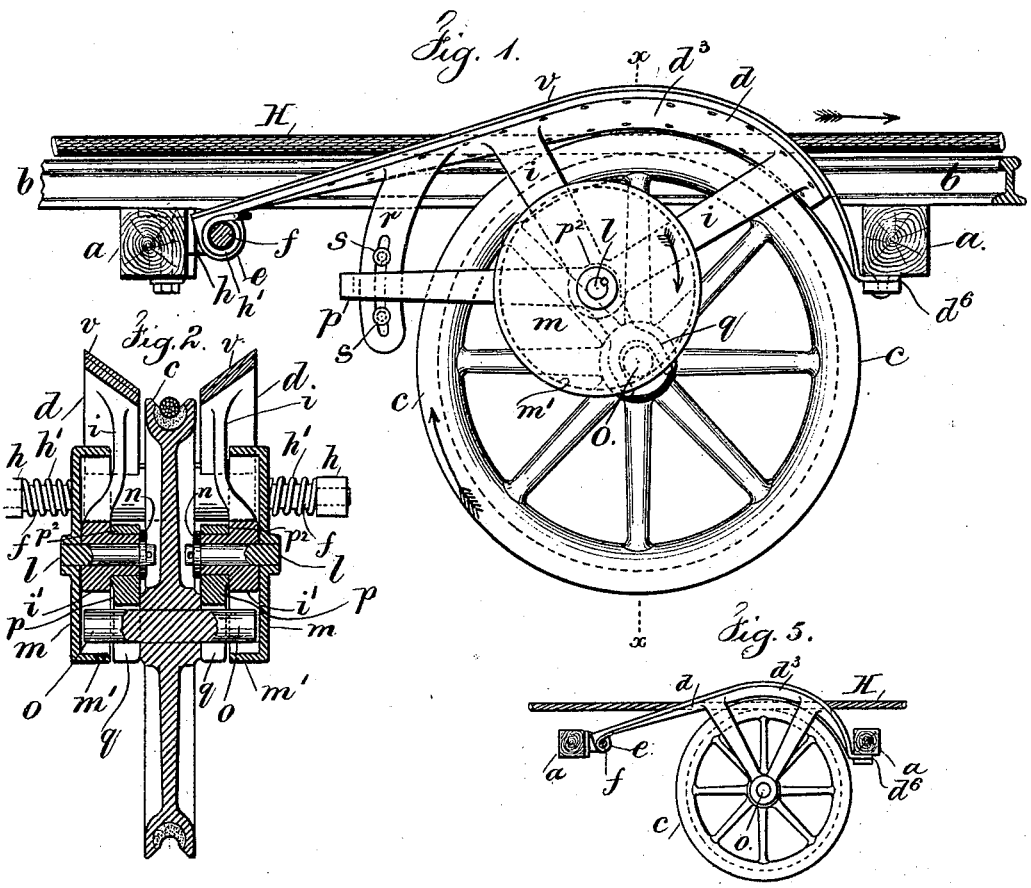
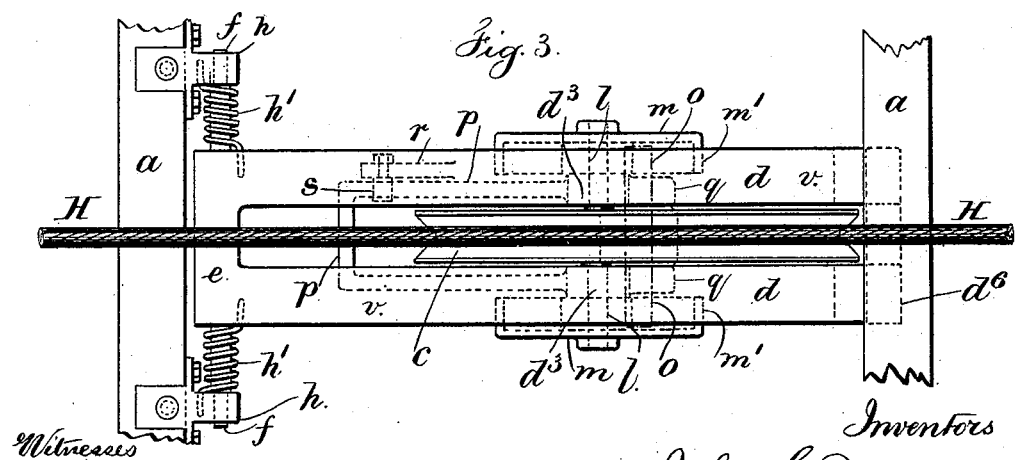
Witnesses
Chas. H. Smith
J. Haib
Inventors
John H. Pendleton
Lincoln Moss
per Lemuel W. Serrell atty.

(No Model.) 2 Sheets—Sheet 2.
J. H. PENDLETON & L. MOSS.
GUIDE PULLEY FOR CABLE RAILWAYS.
No. 404,498. Patented June 4, 1889.
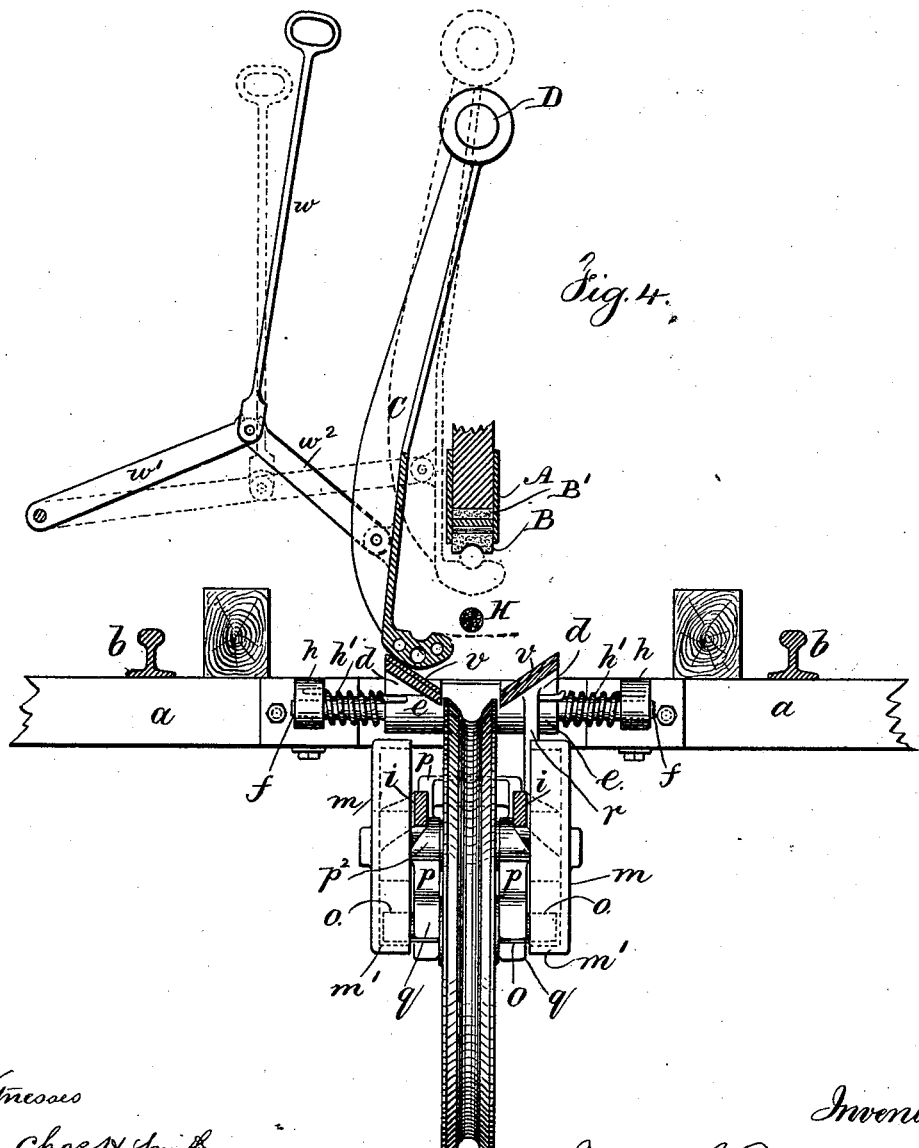

UNITED STATES PATENT OFFICE.

JOHN H. PENDLETON, OF BROOKLYN, AND LINCOLN MOSS, OF NEW YORK, ASSIGNORS TO THE RAPID TRANSIT CABLE COMPANY, OF NEW YORK, N. Y.

GUIDE-PULLEY FOR CABLE RAILWAYS.

SPECIFICATION forming part of Letters Patent No. 404,498, dated June 4, 1889.

Application filed July 21, 1888. Serial No. 280,662. (No model.)

*To all whom it may concern:*

Be it known that we, JOHN H. PENDLETON, of Brooklyn, in the State of New York, and LINCOLN MOSS, of the city and State of New York, have invented an Improvement in Guide-Pulleys for Cable Railways, of which the following is a specification.

In cable railways the cable is sustained and guided in its travel by grooved pulleys placed at suitable distances apart and centrally of the two rails of the track. These pulleys are mounted in fixed bearings, and as said pulleys are small and are continuously rotated by the cable at a rapid speed their axles and bearings are speedily worn and the pulleys "wabble" and become noisy. Another difficulty with the ordinary pulley is, that when the cable is running at a high speed and when its speed is varied by connecting cars to or disconnecting them from the cable, said cable is liable to rise out of the groove of a pulley and drop down at the side of said pulley, thereby causing injury to both cable and pulley. To meet this latter objection pulleys have been made very broad; but the constant rise and fall of the cable wears away the surface of the pulley and leaves no well-defined groove for the cable to travel in; hence the cable moves sidewise upon the pulley and is not kept centrally of the rails.

The objects of our invention are to prevent the cable passing to the side of the pulley in case it should rise out of the groove of the pulley, to use a large and comparatively light pulley, to lessen the friction of the axle of the pulley in its bearings, and to allow the pulley to be depressed, so that the gripping device can be brought down immediately over a pulley and the cable dropped or picked up without injury to either pulley or grip.

In the drawings, Figure 1 is a sectional elevation lengthwise of the track with our improved pulley and its support in place. Fig. 2 is a transverse section at about the line $xx$ of Fig. 1. Fig. 3 is a plan of the pulley and its support. Fig. 4 is a sectional elevation transversely of the track, showing the pulley and its support depressed by the moving part of the gripping device; and Fig. 5 is an elevation of the pulley and its support in a modified form.

$a\ a$ represent the cross-ties of an elevated railway structure, and $b\ b$ the rails thereon.

$c$ represents one of the pulleys which sustain and guide the endless cable H in its travel, and these pulleys are to be placed at suitable distances apart and centrally between the two rails $b\ b$ of the track. The support for the pulley $c$ and its bearings consists of two arms $d\ d$, projecting from the hub $e$, which hub has pivots $f$, fitted to turn in bearings $h\ h$, secured to one of the ties $a$.

$h'\ h'$ are springs around the pivots $f$, and the ends of these springs take against or pass into the arms $d\ d$ and bearings $h\ h$, respectively, and said springs lift the arms $d\ d$ and parts carried by them, so as to keep the pulley $c$ in its proper position to support the cable.

$i\ i$ are arms extending down from the under side of the arms $d\ d$, and through the hub $i'$ of each arm $i$ passes a pivot-pin $l$, to the outer end of which pin is keyed a wheel or disk $m$, having a circular flange $m'$. A washer $n$ and pin keep the pivot-pin $l$ from drawing out of its hub.

The ends of the axle $o$ of the guide-pulley $c$ rest upon and are supported by the inner surfaces of the flanges of the respective wheels or disks $m\ m$, and said flanges form the only bearing for said axle. The pulley $c$, as rotated by the endless cable, causes the flanged disks to rotate by the ends of the axle rolling upon the inner surfaces of said flanges; hence, as there are two rolling surfaces in contact, the friction upon the axle $c$ is much less than if the axle turned in a fixed bearing, and the action of the axle $o$ upon the flanges $m'$ is similar to that of an axle turning in ball-bearings. Further, as the wear upon the axle $o$ and upon the inner surfaces of the flanges $m'\ m'$ will be evenly distributed upon the surfaces of such axle and flanges, there will never be any unevenness of rotation of the pulley $c$ caused by such wear of the parts.

The arrows indicate the direction of motion of the endless cable and the direction of rotation of the pulley $c$ and flanged disks $m$, and it is to be understood that the pulley $c$ will tend to rise by the axle $o$ rolling up the flanges $m'$ $m'$; but said pulley will only rise to about a given point, for it has to rise against the weight of the cable, and when the pulley has reached this extreme point or point of equilibrium the pulley will keep at about that place, and will then rise or fall only as the cable rises or falls. We provide, however, for limiting the travel of the axle $o$ and the consequent rise and fall of its pulley $c$, as next explained.

$p$ is a U-shaped frame fitted to swing upon the hubs $i'$, and the ends of this frame are forked at $q$ to receive the axle $o$.

$r$ is an arm depending from one of the arms $d$, and said arm $r$ is slotted for the adjustable stops $s$ $s$, which stops limit the swinging movement of the frame $p$. The stops $s$ $s$ should be so positioned that the frame $p$ can receive but a slight movement in either direction, and thereby allow but a limited movement to the axle $o$ upon its circular bearings as the point of equilibrium of said axle and its pulley changes, as aforesaid.

By reference to Fig. 2 it will be seen that the eye portions $p^2$ of the frame $p$ bear against shoulders upon the hubs $i'$, and that the inner faces of the forks $q'$ bear against the faces of the hub of the pulley $c$; hence said pulley is kept from moving sidewise and the ends of the axle prevented from striking the disks $m$. The inner edges of the arms $d$ $d$ at $d^3$ are concentric with and quite close to the line of travel of the outer edges of the pulley $c$, and the surface of each arm from its inner edge is inclined upwardly to form guards, so that in case the endless cable should rise out of the groove of the pulley it will run up one or the other of said inclined guards, there not being sufficient space between the pulley and the guard for the cable to pass between them, and as soon as the cause ceases which made the cable run up said incline the cable will slide down said incline and fall into the groove of the pulley. The inner edges of the inclines should be slightly higher than the outer edges of the pulley, so that the cable will not touch said outer edge of the pulley as said cable passes on or off the incline.

The arms $d$ $d$, forming the support for the pulley $c$, are pivoted at $f$, as before described, so that the pulley and its support will be depressed in case the gripping device or any appliance depending from a car should strike the support or its pulley, and no injury will result to either. As soon as the grip or other appliance is raised or passes off the pulley or its support, the springs $h'$ raise said support and its pulley until the ends $d^6$ of the support are arrested by the tie $a$, which forms a stop to limit the upward movement of said support.

We propose to place these guide-pulleys, supported as aforesaid, along the entire length of the straight portions of the road, and they are especially adapted for cable railways in which a grip upon the cars is employed, like that shown in an application for patent, Serial No. 280,658, filed July 21, 1888, so that the cable may be dropped or picked up at any point in the straight portions of the road, and a reference is hereby made to said application for a more full description of said grip than is given herein.

In Fig. 4 we have represented sufficient of this grip to illustrate how the pulley and its support can be depressed and the cable dropped or picked up when the grip is immediately over one of the guide-pulleys $c$.

A represents the stationary portion of the grip; B, the endless belt, against which the cable is clamped; and C is the moving part of the grip, pivoted at D in a sliding support, (the latter not shown in the drawings,) and the lower part of the moving portion of the grip is made as a hook having a semicircular groove for the cable to rest in.

When the cable is clamped by the grip, the moving part of the grip occupies the position shown by dotted lines in Fig. 4. If, now, the cable is to be dropped, the moving part C of the grip is first lowered vertically, and as soon as the under part of the hook comes in contact with the arms $d$ $d$ said arms and the pulley $c$ are carried down by said hook, and when the hook reaches its extreme lowest point the cable H is above the hook, and the latter is now to be swung upon its pivot D to the position shown by full lines in Fig. 4, the under surface of the hook riding over the inclined surface of the arm $d$ during the latter movement. This swinging movement of the hook is effected by a pull upon the rod $w$, which latter acts through the links $w'$ $w^2$ to swing the moving part C and its hook. If the moving part of the grip is now raised from the position of full lines, Fig. 4, and then swung so as to bring the hook under the stationary part of the grip and raised to the position shown by dotted lines in said figure, the pulley-support and pulley are at once raised by the springs $h'$ $h'$ to the position shown in Fig. 1, and the cable rests in the groove of the pulley.

If the cable is to be picked up, the moving part of the grip is first swung outwardly by pulling upon the rod $w$. Then said moving part is lowered, and if over the pulley-support the latter is depressed to the position shown by full lines in Fig. 4 by contact with the under surface of the hook. Then by pressing upon the rod $w$ the links $w'$ $w^2$ are straightened and the moving part of the grip is swung upon its pivot and the hook brought under the cable, and upon the upward movement of the hook the cable is lifted and clamped between the hook and the stationary part of the grip. The pulley-support and pulley follow the upward movement of the hook until the ends $d^6$ $d^6$ of the pulley-support $d$ $d$ come in contact with the tie $a$, when the pulley is in position for the cable to be laid in it after the grip has been moved beyond said pulley.

It is preferable to make the hub $e$, arms $d\,d$, $i\,i$, and $r$ in one piece of cast metal, and we strengthen the casting by adding a plate of sheet-iron $v$, (preferably boiler-iron,) the same being applied to the top surface of the arms $d\,d$ and riveted to said arms.

We remark that we do not limit ourselves to the use of the pivoted pulley-support having the inclined guards in connection with a guide-pulley mounted in anti-friction bearings, as in Figs. 1, 2, 3, and 4, as said pulley may be mounted in ordinary bearings upon the pulley-support, as illustrated in Fig. 5; and we also remark that only one inclined guard may be used when the pulley has a long conical surface, like the pulley F shown in an application for patent, Serial No. 276,935, filed June 13, 1888, the guard being applied to the pulley-support at the flanged or short conical end of said pulley.

We claim as our invention—

1. The combination, with the guide-pulley, of the arms $d$, pivoted at one end and having inclined flanges adjacent to the guide-pulley, lifting-springs, and a stop at the other end of the arms to limit the upward movement, substantially as specified.

2. The combination, with the guide-pulley, of arms $d$, pivots at one end of such arms, and a spring for raising the arms and pulley, a stop to limit the upward movement, and flanged disks facing each other and receiving upon their flanges the axis of the guide-pulley, substantially as specified.

3. The combination, with the pivoted pulley-support and the guide-pulley and its axle, of disks or wheels at opposite sides of said pulley, pivots for said disks, circular flanges upon said disks for the ends of the axle of the guide-pulley to roll upon, and supports for the pivot-pins of the disks, substantially as specified.

4. The combination, with the pivoted pulley-support, guide-pulley and axle, flanged disks, and pivots and bearings for the same, of the swinging frame P, having forked ends to receive the axle $o$, the slotted arm $r$, and stops $s\,s$, substantially as and for the purposes specified.

Signed by us this 19th day of July, 1888.

J. H. PENDLETON.
LINCOLN MOSS.

Witnesses as to signature of J. H. Pendleton:
GEO. T. PINCKNEY,
WILLIAM G. MOTT.

Witnesses as to signature of Lincoln Moss:
BENJAMIN PARKER,
ALICE E. THOMAS.